Patented Dec. 13, 1949

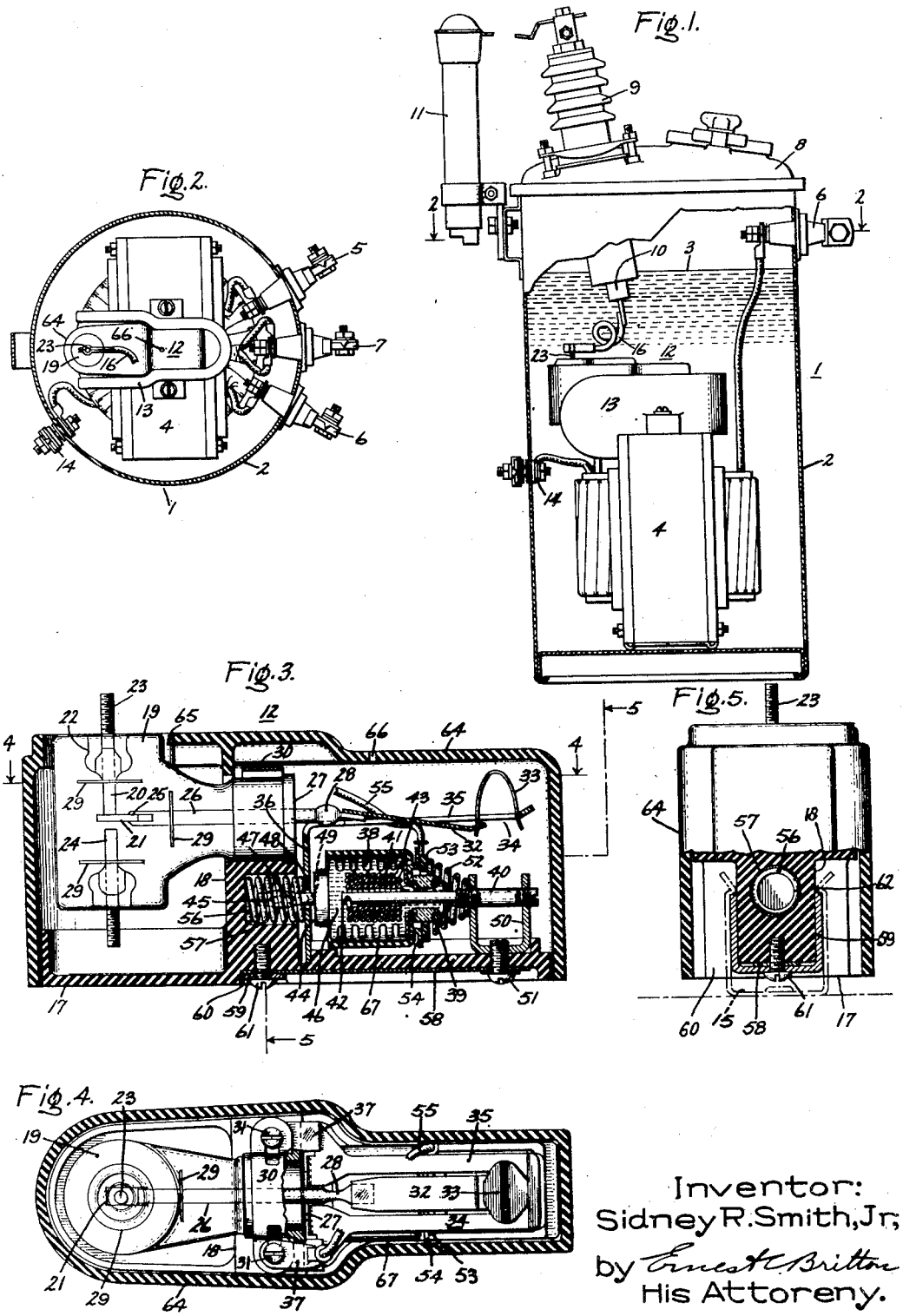

2,491,338

UNITED STATES PATENT OFFICE 2,491,338

PROTECTIVE SWITCH DEVICE

Sidney R. Smith, Jr., Pittsfield, Mass., assignor to General Electric Company, a corporation of New York Application August 6, 1945, Serial No. 609,188

7 Claims. (Cl. 200—122)

My invention relates to a protective device for electrical apparatus, and more particularly to means for interrupting the current flowing through the electrical apparatus upon the occurrence of predetermined conditions of the associated circuit or of the apparatus.

Electrical apparatus, and particularly apparatus employing a liquid insulating dielectric, such as transformers, are subject to various types of disturbances. One type of disturbance which might occur is a fault condition on the associated circuit causing very high currents to flow through the windings of the transformer. If protective means were not provided to interrupt the current flowing, these fault or short circuit currents might destroy the transformer. Another type of disturbance which might occur is an overload condition which continues for a long period of time so that the temperature of the liquid dielectric, which may be oil or the like, increases above a safe value. It is not only desirable but necessary that the electrical apparatus, when subjected to long time overloads, be disconnected when its temperature reaches a predetermined value.

In recent years a large number of protective devices have been provided for electric apparatus such as transformers but all of these devices have had certain shortcomings. For example, if the device were mounted in the transformer immersed in the insulating dielectric the arcing during the circuit interrupting operation would cause contamination of the oil. Heretofore such devices were one-shot devices and were placed in the secondary circuit. As a result of this they had to be of fairly large size so as to be capable of interrupting large currents. However, since they had to perform only one interrupting operation as contrasted with repeated openings and closings it was a simple matter to design such a device. Also the secondary windings of transformers of the distribution type to which my invention is particularly applicable are generally made in two parts with four leads brought out to terminals on the transformer casing, two leads of which are usually connected to the center terminal which is generally grounded. A protective device for the secondary winding, therefore, would require at least two sets of contacts.

It would be desirable to provide a protective device for electric apparatus, such as distribution transformers, which would be connected in the primary winding so that only a single device with a single set of contacts is required. For a 5 kva.-7200 volt 120/240 volt transformer, for example, such a device would only have to interrupt 1/30 or 1/60 as much current as a similar device connected in the secondary winding, and consequently could be of such a small size as not to interfere with the transformer size or construction. Such small size would obviously reduce the cost and being associated with the primary winding, standard secondary leads could be employed with no complications being introduced when transformers are paralleled or the secondary windings are connected in series. It would furthermore be desirable to provide a protective device which is capable of repeatedly opening and reclosing the circuit which could be immersed in the liquid dielectric so as to be responsive both to fault currents and long time overloads, and in which no contamination of the oil or liquid dielectric by virtue of arcing could occur and consequently no explosive gases would be created. It would furthermore be particularly desirable to provide an automatic reclosing protective device for transformers which would operate repeatedly to open the circuit and restore service thereby eliminating many trips by power company personnel to restore service, which automatic device is simple and compact and no more expensive than one-shot devices in use today.

It is an object of my invention to provide a new and improved circuit interrupting means.

It is another object of my invention to provide an automatic reclosing current interrupting device for use in transformers which is designed for repeated operation especially applicable for rural lines so that patrolling of the lines by power company personnel is substantially eliminated.

It is another object of my invention to provide a protective device for electric apparatus such as transformers, which is designed so as to require only a single device with a single set of contacts per transformer, which requires a very small amount of energy for mechanical operation, and which is of small size, requiring little space and consequently of low cost.

It is another object of my invention to provide a new and improved reclosing circuit interrupting device for use in series with the primary windings of electric transformers which affords protection both against short circuits and long time overloads.

It is another object of my invention to provide a new and improved circuit interrupting device provided with thermal means for controlling the same which may be mounted in the liquid dielectric of electric apparatus, such as transformers, constructed so that operation thereof causes no contamination of the liquid dielectric or the production of explosive gases, and oxidation of the contacts is completely eliminated.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is an elevational view, partly in section, of an electrical apparatus, specifically a transformer, embodying my invention; Fig. 2 is a sectional view taken on line 2—2 of Fig. 1; Fig. 3 is an enlarged sectional view of the interrupting device employed in Figs. 1 and 2; Fig. 4 is a sectional view taken on line 4—4 of Fig. 3 assuming Fig. 3 shows the complete device, and Fig. 5 is a sectional view taken on line 5—5 of Fig. 3 also assuming Fig. 3 shows a complete device.

Although the new and improved circuit interrupting device of my invention may have many applications, it is specifically applicable to the protection of electric apparatus such as transformers, and accordingly it will be described hereinafter in this specific connection, although it should be understood that my invention is not limited to this specific application. Referring now to Fig. 1, there is illustrated an electric apparatus specifically shown as a transformer 1 comprising a casing 2 which is filled to the level 3 with an insulating liquid dielectric such as oil or the like. Immersed within the insulating liquid are the transformer core and windings generally designated by the numeral 4.

The low voltage or secondary windings are effectively provided with a mid-tap so that three terminals specifically designated as 5, 6, and 7 are provided, 7 forming the mid-tap of the secondary winding and usually being grounded. The transformer casing 2 is provided with a cover 8 which supports the high voltage bushing 9. Preferably mounted within high voltage bushing 9 is a suitable protective device, such as a bushing fuse 10, only a portion of which is shown which provides protection to the distribution line and insures continuation of service therefrom by disconnecting the transformer in the event of an internal fault. High voltage fuse 10 is preferably of the type disclosed in my prior joint Patent 2,337,353, granted December 21, 1943, and assigned to the same assignee as the present application. In order to protect the transformer against high voltage surges, such as lightning, a suitable lightning arrester 11 is illustrated as being supported from the transformer casing. This lightning arrester may comprise any suitable construction but is specifically illustrated as of the type disclosed and claimed in a copending application of John W. Kalb, Serial No. 578,894, filed February 20, 1945, and assigned to the same assignee as the present application.

In most protected transformers on the market today a low voltage circuit breaker is provided in series with the secondary winding of the transformer. For a conventional 5-kva. rural distribution transformer the current which flows in the secondary winding for secondary line-to-line faults is thirty times the current flowing in the primary winding and for a line-to-neutral fault 60 times the current flowing in the primary winding. It is quite obvious then that a circuit breaker placed in the secondary winding requires large conducting parts and since three leads are brought out, as is indicated by the terminals 5, 6, and 7, at least two sets of interrupting contacts will be required. In accordance with my invention I have provided a circuit interrupting device generally indicated at 12 which is connected in series with the primary winding of the transformer and since only a single high voltage bushing 9 is required, only a single set of interrupting contacts is required. Distribution transformers are usually provided with a high voltage terminal board which is indicated at 13 and which is supported on the core and winding structure 4. One terminal of the high voltage winding specifically designated at 14 is grounded to the tank or casing 2, while the other terminal terminates in a spring clip 15, shown in dotted lines in Fig. 5 so that quick detachable connection with the circuit interrupting device of my invention can be made. The circuit interrupting device 12 is also connected by a suitable conductor 16 with the bushing fuse 10 whereby the interrupting device 12 of my invention is connected in series with the high voltage winding so that the current magnitude it is required to interrupt is only a small percentage of the current which flows in the secondary windings of the transformer. Of course the voltage which the device must interrupt is much higher than would be the case if connected in the secondary windings but the vacuum type protective device of my invention is inherently suited for interrupting high voltages in a small space, so long as the current is of a low order of magnitude.

The circuit interrupting device 12 of my invention comprises a high voltage circuit breaker of very small dimensions so that it may be directly mounted to the transformer terminal board 13. As illustrated, this high voltage circuit breaker 12 comprises an insulating support 17 including an upwardly extending central portion 18 for supporting an evacuated envelope 19 formed of glass or other suitable insulating material. This evacuated envelope is preferably in the form of a vacuum switch such as is disclosed in United States Letters Patent 2,383,973, Jones, granted September 4, 1945, and assigned to the same assignee as the present application. The vacuum switch comprising the evacuated envelope 19 includes a pair of relatively movable contacts 20 and 21, the contact 20 being a stationary contact suitably supported in envelope 19 by a glass-to-metal seal 22. Contact 20 extends outside the evacuated envelope and is provided with a threaded portion 23 which forms one terminal of the circuit interrupting device 12 of my invention and which is adapted to be connected to conductor 16, as is clearly shown in Fig. 1. Vacuum switches of the type disclosed in the above mentioned Jones patent, are single pole, double throw switches. Since the second pole of the switch 24 is not required in this application from the electrical standpoint, it is however useful as a stop to limit the opening movement of movable contact 21. Actually stop 24 is identical in every respect with contact 20, although it will be understood that any suitable stop might be provided, the specific construction illustrated being employed since it permits utilization of a standard vacuum switch which may be purchased on the open market. The evacuated envelope 19 is T-shaped with the stop 24 and contact 20 entering through re-entrant seals in the arms of the T. The movable contact 21 is a spade-like member preferably formed of molybdenum or the like and suitably attached as indicated at 25 to the slotted free end of a tubular switch arm 26. This arm is preferably composed of copper-plated steel tubing and extends through and is copper-brazed and sealed to a diaphragm 27 which closes the end of T-shaped evacuated container 19. The diaphragm 27 is suitably united to the glass envelope by a glass-to-metal seal. When the switch is completed and evacuated through tubular switch arm 26 this tubular arm is flattened, as indicated at 28 and sealed exteriorly of casing 19. In order that the vacuum switch described above is capable of interrupting currents as high as 40 amperes successfully at 7500 volts, a plurality of disk-shaped shields 29 are provided which are associated with stationary contact 20, stop 24, and tubular switch arm 26. With this arrangement fairly high currents at 7500 volts are readily interrupted with a very small movement of contact arm 21, this movement being of the order of a very small fraction of an inch.

The vacuum switch including evacuated envelope 19 is suitably supported from upwardly extending portion 18 of insulating base 17 by means of a clip 30 and a plurality of screws 31, in a manner so that the portion of tubular switch arm 26 extending outside of envelope 19 and which acts as a switch operating arm, extends toward one end of base 17 while the envelope part 19 of the vacuum switch extends toward the other end of base 17. Fastened to the portion of switch arm 26 extending outside of evacuated envelope 19 is an extension 32 which is connected to one end of a flat U-shaped toggle spring 33. The other end of the toggle spring 33 is connected to one end of an L-shaped operating lever 34 which has a portion 35 substantially parallel to tubular switch arm 26 and a portion 36 substantially perpendicular to tubular switch arm 26. L-shaped member 34 is bifurcated so that extension 32 may be interposed between the bifurcations. At the junction between the portions 35 and 36 of L-shaped member 34 there are provided a pair of thin hinge strips 37 which are welded, or otherwise suitably fastened to L-shaped member 34 and in turn fastened to the upwardly extending portion 18 of base 17 as by screws 31. With this arrangement, if the portion 36 of lever 34 in Fig. 3 is moved to the left, toggle spring 33 will cause extension 32 to be moved upwardly so that contacts 20 and 21 are separated with a snap action. If portion 36 of lever 34 is subsequently moved to the right so as to pivot about hinge members 37, contacts 20 and 21 are reclosed with a snap action by virtue of toggle spring 33. In other words, means comprising a sort of overcenter device are provided to produce snap action of the contacts both in opening and closing.

In order to cause relative movement between contacts 20 and 21 in response to both long time overloads as determined by the temperature of the liquid dielectric in casing 1 as well as fault currents, I provide a flexible metal bellows assembly which comprises a metal bellows 38 having one end closed by an insulating seal, such as a glass seal 39 and an adjustment rod 40. Rod 40, which is provided with a threaded portion exteriorly of bellows 38, extends into the interior of the flexible metal bellows but is insulated therefrom by the glass or other suitable insulating member 39 which seals rod 40 to bellows 38. The end of rod 40 within bellows 38 is electrically connected to one end of heater coil 41, as indicated at 42, while the other end of heater coil 41, as indicated at 43, is connected to the walls of bellows 38. The end of bellows 38, which is cylindrical in form, opposite the end closed by insulating member 39, is closed by a flat wall 44 which is provided with a tubular extension 45 through which the bellows may be filled with a suitable liquid 46 and sealed as indicated at 47.

The bellows 38 is preferably completely filled with the liquid 46 which is preferably chosen so as to have a boiling temperature at substantially the operating temperature of the vacuum switch. A suitable liquid may be trichloroethylene, which is also an anti-freeze. By coiling the heater wire 41 as indicated, it is possible to provide more thermal energy than was possible in prior arrangements. Heater coil 41 is preferably formed of a high resistance wire, such as wire which may be purchased on the market under the trade name Nichrome, which wire is covered with a glass insulation and the insulation in turn is covered with a phenolic varnish which is insoluble in the bellows liquid 46 when properly cured. With this arrangement a coil having a resistance of between two to three ohms may be placed in a bellows having a diameter of ¾ inch or less and a length of an inch or less.

Preferably the bellows assembly comprising bellows 38 is mounted so the tubular extension 45 extends through an opening 48 in portion 36 of lever 34. Portion 36 of lever 34 is provided with a raised portion 49 so that line contact with the flat wall 44 of bellows 38 is provided whereby the lever arm for actuating contact 21 does not change regardless of the movement of bellows 38.

The rod 40 extending outside of bellows 38 is threadedly mounted in a U-shaped support 50 supported from base 17 as by means of a screw 51. A suitable coiled spring 52 is interposed between U-shaped member 50 and an insulating disk 53, which in turn engages a contact ring 54 in slidable electrical connection with the end of bellows 38. Spring 52 biases contact ring 54 into electrical contact with the right-hand end of the bellows to insure good electrical contact therebetween. Contact ring 54 is electrically connected by flexible conductor 55 to switch arm 26. Preferably, the bellows assembly is spring loaded and to this end I provide a coiled spring 56 which is mounted in a recess 57 in upwardly extending portion 18 of base 17. One end of coiled spring 56 engages the portion 36 of L-shaped lever 34 so as to load the bellows assembly with a force of the order of ten pounds to the square inch or so. With this arrangement no movement of the bellows will occur until the pressure of the liquid within the bellows exceeds the spring loading. Adjustment of the trip temperature may be obtained by rotating threaded rod 40 which causes rotation of the entire bellows assembly and sliding contact between one end of bellows 38 and contact ring 54.

In the closed position of the circuit interrupting means of my invention, current flows from stationary contact 20 through movable contact 21, switch arm 26, flexible conductor 55, contact ring 54, bellows 38, heater coil 41, rod 40, U-shaped member 50, and screw 51, to a conducting member 58 extending along the bottom of base 17. The end of conducting member 58 is electrically connected to a U-shaped member 59 mounted in a recess 60 in base 17. A suitable screw 61 supports U-shaped member 59 and the end of conducting member 58 from base 17. As is clearly obvious from Fig. 5, U-shaped contact 59 is arranged to be detachably connected to spring clip 15 shown in dotted lines in Fig. 5, which in turn is connected to one end of the prmary winding of the transformer 1. With this arrangement, it is obvious that the circuit interrupting means of my invention, disregarding the connection with lead 16 for the moment, may readily be connected or disconnected by mere engagement with the spring clip 15, which also serves to hold the circuit interrupting means in position since indentations on the contacting portion of spring clip 15, indicated at 62 in Fig. 5, are adapted to engage with a portion of U-shaped contact 59.

A suitable cover of insulating material 64 may preferably be provided, which may be fastened to base 17 by any suitable readily detachable means. Cover 64 is provided with an opening 65 through which the portion 23 of contact 20 may extend and also with an opening 66 so that the liquid dielectric may enter the casing.

In order that the liquid dielectric in the casing 2 of transformer 1 does not cool the liquid 46 in bellows 38 too rapidly under short circuit conditions and in order to increase the temperature rise of the bellows liquid due to current in the heater coil, I preferably provide a thermal lagging sleeve 67 formed of insulating material which substantially encloses a major portion of bellows 38 to reduce the heat transfer.

In view of the detailed description included above, the operation of the protective device and interrupting means of my invention will be obvious to those skilled in the art. Under short-circuit or fault conditions the current flowing through heater coil 41 causes the liquid 46 to heat up rapidly to the vapor point of the liquid. Thermal lagging sleeve 67 prevents too rapid cooling of the liquid 46 under these conditions. Such heating of liquid 46 and vaporization thereof causes bellows 38 to expand so as to push against the raised point 49 on portion 36 of L-shaped lever 34, thereby moving it in a clockwise direction about hinge members 37, as viewed in Fig. 3, with the result that flat spring 33 with a toggle action moves switch arm 26, thereby causing contacts 20 and 21 to separate with a snap action. This interrupts the circuit through the primary winding of the transformer and consequently through the heater coil 41. Thereupon the vapor formed in bellows 38 condenses back to a liquid allowing the bellows to contract so that spring 33 reverses the motion of switch arm 26 causing the contacts 20 and 21 to reclose. If the short-circuit condition persists, the circuit interrupting means will continue to cycle with the time the switch remains open gradually lengthening as the liquid dielectric immediately surrounding the bellows 38 warms up. This is beneficial in minimizing the number of cycles which the switch will have to interrupt during a long period in which a short-circuit persists on the secondary circuit of the transformer. It will be obvious that if a fault or short-circuit continues, the average current flowing in the transformer will just supply the losses in heat from bellows 38. Thermal lagging sleeve 67 reduces these losses whereby a further means is provided for reducing the number of openings and closings of the switch under short circuit conditions, which is desirable.

In the event of a long time overload, the temperature of the liquid dielectric in transformer casing 2 gradually increases so as eventually to cause expansion of bellows 38 and relative separation of contacts 20 and 21. To get faster reclosing of the circuit under such conditions, it is desirable that the opening temperature of the circuit interrupting means 12 be set at a fairly high value, thereby providing a greater differential between the opening temperature and the ambient temperature.

The thermal means for operating contacts 20 and 21 comprising the bellows assembly described above, has numerous advantages over thermal means such as a bimetallic element or an expansible wire. By choosing a liquid 46 of a definite boiling point, slight variations in clearance are immaterial since once the vapor point of the liquid 46 has been reached it will follow through its tripping motion with a minor increase in the temperature of liquid 46. On the other hand, bimetals and expansible wires provide relatively small motion for a given temperature rise and if it is desired to double the motion the temperature rise must be doubled. With my above described arrangement the relatively large travel of the bellows assembly permits the use of a low cost housing such as the base 17 and cover 64 for mounting the parts, which is not possible with other arrangements.

It will be obvious that by employing the vacuum envelope 19 no contamination of the liquid dielectric can occur upon interrupting the circuit of the transformer, and oxidation of the contacts is also completely eliminated. By providing the interrupting means 12 in the primary circuit a very small device is required which can readily be applied to many transformer designs without the slightest change in size of the transformer casing. Furthermore, with such an arrangement a very small mechanical force is required to operate the switch or circuit interrupter. The calibration of the thermal means described above is very simple and better control of the time current characteristic can be obtained.

While I have shown and described a particular embodiment of my invention, it will be obvious to those skilled in the art that various changes and modifications may be made without departing from my invention in its broader aspects and I therefore aim in the appended claims to cover all such changes and modifications as fall within the true spirit and scope of my invention.

What I claim as new and desire to secure by Letters Patent of the United States, is:

1. The combination of a protective device for electric apparatus of the type having a body of liquid insulating dielectric comprising an evacuated envelope mounted so as to be immersed in said liquid dielectric, a pair of relatively movable contacts mounted within said envelope, means comprising operating means positioned outside said envelope including an overcenter device for causing said contacts to operate with a snap action, thermal means immersed in said dielectric sensitive to both load current and the temperature of said liquid dielectric for controlling the operation of said overcenter device, said contacts being arranged to be opened and closed repeatedly in accordance with predetermined conditions of current and temperature of said liquid dielectric, and means for reducing the heat transfer between said thermal means and said liquid dielectric.

2. A protective device for electric apparatus of the type having a body of liquid insulating dielectric comprising a pair of relatively movable contacts, means including an L-shaped lever arranged to operate as an overcenter device for causing said contacts to operate with a snap action, thermal means immersed in said dielectric comprising an expansible bellows containing a fluid, resistance means connected in series with said contacts, positioned in said fluid so that said thermal means is sensitive to both load current and the temperature of said liquid dielectric, means for supporting said thermal means so that the end of said bellows engages said L-shaped lever whereby said contacts are arranged to be opened and closed repeatedly in accordance with predetermined conditions of current flowing through said contacts and the temperature of said liquid dielectric and means for reducing the heat transfer between said thermal means and said liquid dielectric.

3. The combination of a protective device for electric apparatus of the type having a body of liquid insulating dielectric comprising a pair of relatively movable contacts, means including an L-shaped lever arranged to operate as an overcenter device for causing said contacts to operate with a snap action, thermal means immersed in said dielectric comprising an expansible bellows containing a fluid, resistance means connected in series with said contacts positioned in said fluid so that said thermal means is sensitive to both load current and the temperature of said liquid dielectric, means for supporting said thermal means so that the end of said bellows engages said L-shaped lever whereby said contacts are arranged to be opened and closed repeatedly in accordance with predetermined conditions of current flowing through said contacts and the temperature of said liquid dielectric, and a sleeve of insulating material substantially enclosing said bellows for reducing the heat transfer between said thermal means and said liquid dielectric.

4. A protective device for electric apparatus of the type having a body of liquid insulating dielectric comprising a pair of relatively movable contacts, means including an L-shaped lever arranged to operate as an overcenter device for causing said contacts to operate with a snap action, thermal means immersed in said dielectric comprising an expansible bellows containing a fluid, resistance means connected in series with said contacts positioned in said fluid so that said thermal means is sensitive to both load current and the temperature of said liquid dielectric, means for supporting said thermal means so that the end of said bellows engages said L-shaped lever whereby said contacts are arranged to be opened and closed repeatedly in accordance with predetermined conditions of current flowing through said contacts and the temperature of said liquid dielectric, means for adjusting the operating point of said bellows and means for reducing the heat transfer between said thermal means and said liquid dielectric.

5. The combination of a protective device for electric apparatus of the type having a body of liquid insulating dielectric comprising an evacuated envelope mounted so as to be immersed in said liquid dielectric, a pair of relatively movable contacts mounted within said envelope, means for causing said contacts to operate with a snap action, thermal means immersed in said dielectric comprising an expansible bellows containing a fluid, a heater coil mounted in the fluid in said bellows and connected in series with said contacts so that said thermal means is sensitive to both load current and the temperature of said liquid dielectric, means for supporting said thermal means so as to control said first mentioned means, said contacts being arranged to be opened and closed repeatedly in accordance with predetermined conditions of the current flowing through said contacts and temperature of said liquid dielectric, means for rotatably mounting said bellows for adjustment of the operating temperature, and a sliding contact for electrically connecting said heater coil in said bellows with said contacts.

6. A protective device for electric apparatus of the type having a body of fluid insulating dielectric comprising an evacuated envelope, a pair of relatively movable contacts mounted within said envelope, thermal means mounted so as to be immersed in said fluid dielectric and sensitive to both load current and the temperature of said fluid dielectric for controlling the operation of said contacts, said contacts being arranged to be opened and closed repeatedly in accordance with predetermined conditions of current and temperature of said fluid dielectric and means for reducing the heat transfer between said thermal means and said fluid dielectric.

7. A protective device for electric apparatus of the type having high voltage and low voltage windings and a body of fluid insulating dielectric comprising an evacuated envelope, a pair of relatively movable contacts mounted within said envelope and connected in the high voltage winding of the apparatus, thermal means including an expansible bellows mounted so as to be immersed in said fluid dielectric and sensitive to both load current and the temperature of said fluid dielectric for controlling the operation of said contacts, said contacts being arranged to be opened and closed repeatedly in accordance with predetermined conditions of current and temperature of said fluid dielectric and means for reducing the heat transfer between said bellows and said fluid dielectric.

SIDNEY R. SMITH, JR.

REFERENCES CITED

The following references are of record in the file of this patent:

UNITED STATES PATENTS

| Number | Name | Date |
| --- | --- | --- |
| 1,523,505 | Barnett | Jan. 20, 1925 |
| 2,053,944 | Cooney | Sept. 8, 1936 |
| 2,073,286 | Raney | Mar. 9, 1937 |
| 2,128,427 | Means | Aug. 30, 1938 |